Figure 1:
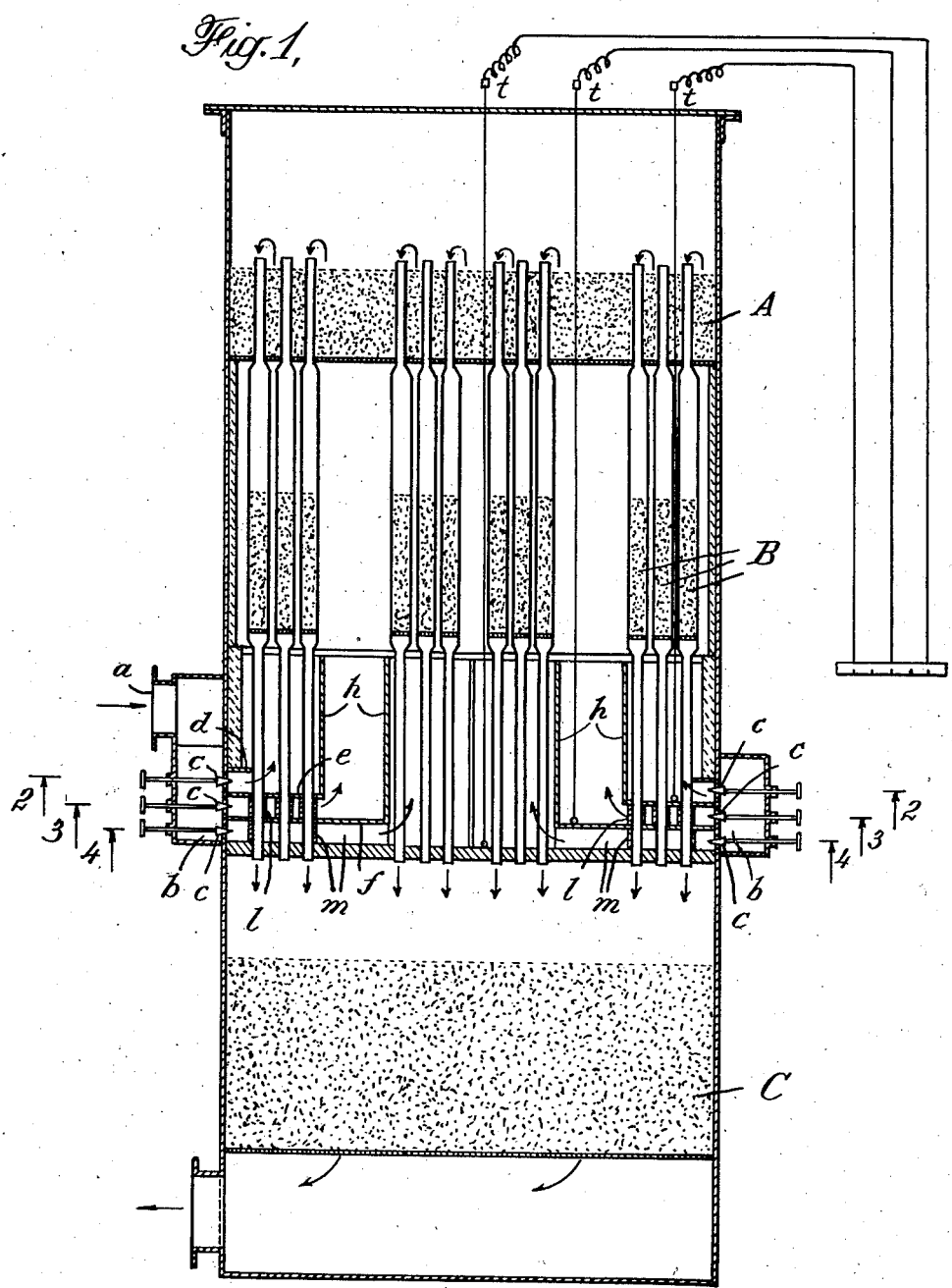

March 28, 1944. W. PFANNMÜLLER ET AL 2,345,423
APPARATUS FOR CARRYING OUT CATALYTIC GAS REACTIONS
Filed Aug. 13, 1940 4 Sheets-Sheet 2

INVENTORS
WILHELM PFANNMULLER
JOSEF REICHART
BY
Henry W. Coughlin
ATTORNEY.

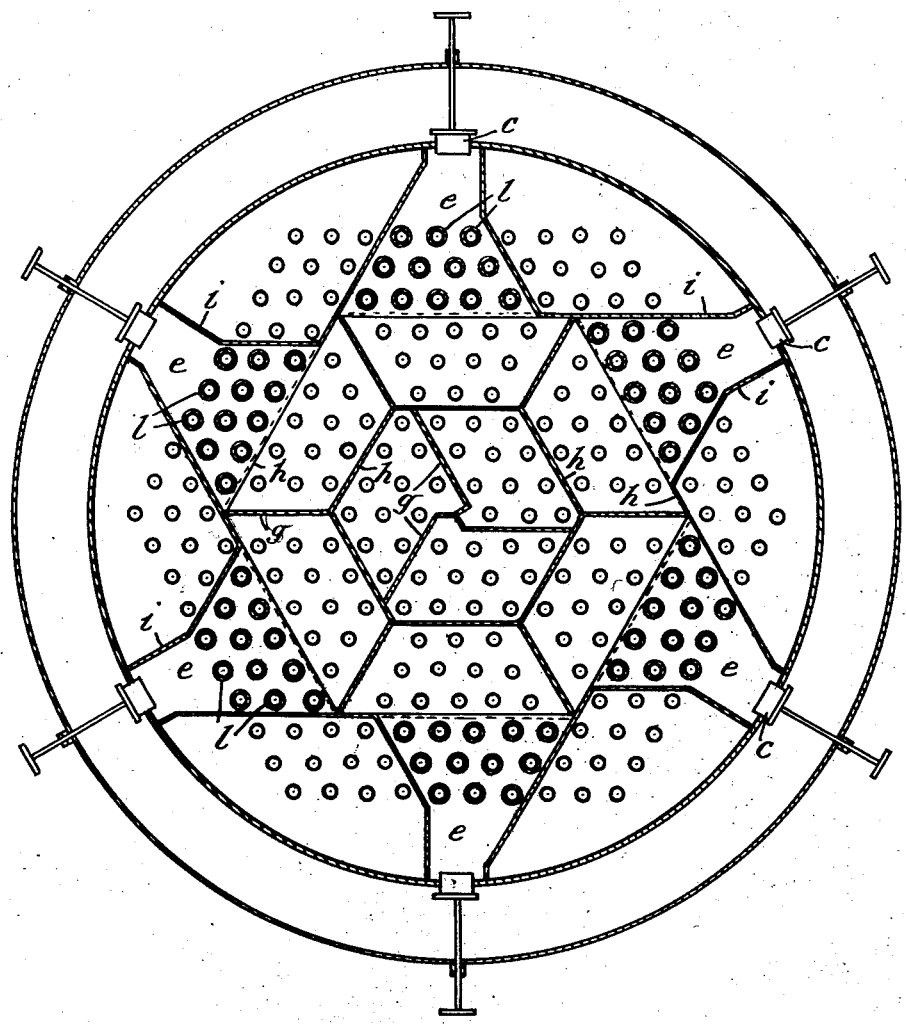

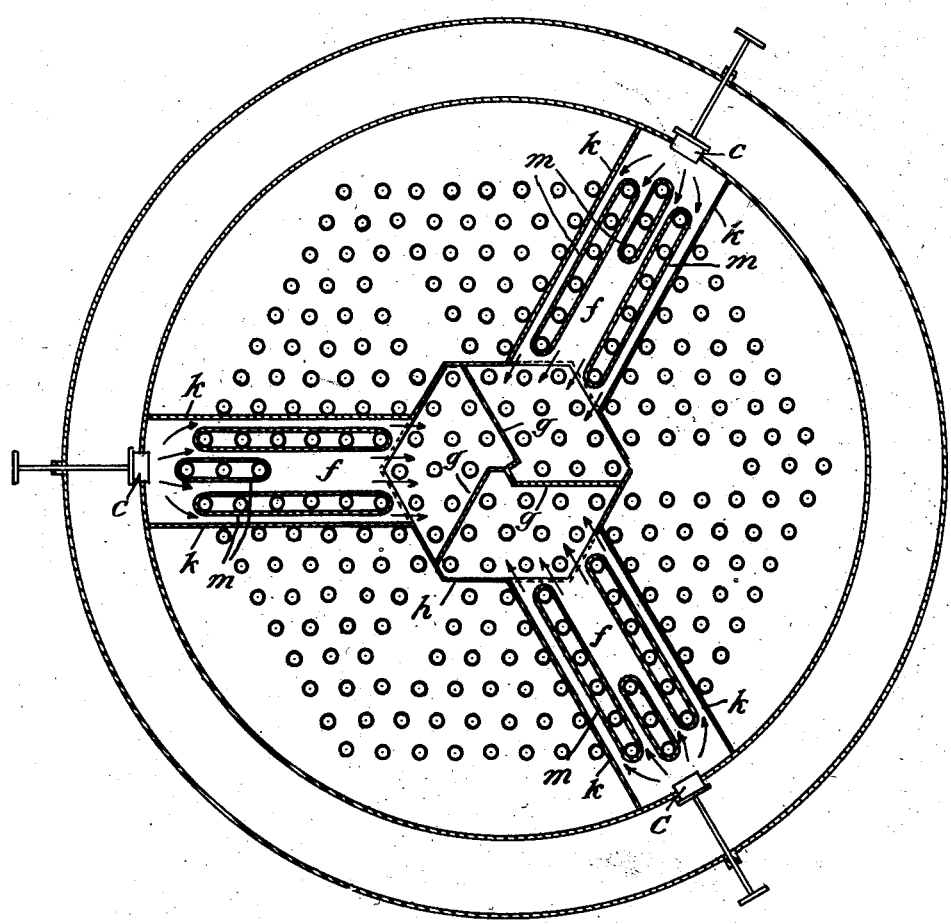

Patented Mar. 28, 1944

2,345,423

UNITED STATES PATENT OFFICE 2,345,423

APPARATUS FOR CARRYING OUT CATALYTIC GAS REACTIONS

Wilhelm Pfannmüller, Mannheim, and Josef Reichart, Ludwigshafen-on-the-Rhine, Germany; vested in the Alien Property Custodian Application August 13, 1940, Serial No. 352,420
In Germany August 2, 1939

1 Claim. (Cl. 23—288)

The present invention relates to improvements in and apparatus for carrying out catalytic gas reactions.

In carrying out exothermic and endothermic catalytic processes in a chamber containing a bundle of tubular reaction vessels, it is essential that the fresh gases, while being led in the space around the tubes which are charged with catalytic material and thus in heat exchange relation to the gas within the tubes, should remove from or supply to all tubes an equal amount of heat and meet the first catalytic layers over the whole cross-section with as equal a temperature and in as equal amounts as possible. Difficulties, however, are encountered in the attempt to obtain an entirely satisfactory uniformity of distribution of the gas, since the usual means, such as annular distribution plates arranged above the entry channel of the fresh gas, if desired in combination with rakes or aprons arranged beneath the said distribution plates, or stowing rims provided at the gas entry or the like, do not prove fully sufficient.

In accordance with our present invention the gases, before passing along the tubes charged with catalytic material, are uniformly distributed in controllable proportions over the whole cross-section, by conveying the fresh gases from the mantle surrounding the bundle into a number of cells which subdivide the cross-section of the chamber into spaces embracing each practically equal number of tubes and being provided with control means for securing an individual attendance of each cell from outside. We prefer in practice to subdivide the space around the tubes into cells of an approximately equal cross-section, preferably by partition walls arranged in radial and tangential direction. Into each of the cells thus formed the gases are supplied through channels formed by suitable side walls fitted in the gas distribution space of the chamber. Each supply channel and hence each cell is provided with a control valve mounted to the chamber wall. In order to enable a controlling of the gas supply to the different cells, the temperature of the gas led around the tubes is measured in each cell by means of a thermo-element or the like and adjusted by means of the control valve. The control valves, since they are partly arranged one above the other, are advantageously provided with a flat, instead of with a round passage, so that with a small elevation a large cross-section for the gas passage is set free which can be adjusted to any aperture from the closed to the fully open state.

The above described arrangement allows of a very favourable distribution of the gas over the whole cross-section of the chamber so that the temperatures measured in the catalyst mass at any distance from the base would vary over the whole cross-section of the chamber by a few degrees centigrade only.

The nature of the invention will be further described with reference to the accompanying drawings which illustrate an arrangement of apparatus suitable for carrying out catalytic reactions in compliance with the present invention.

Figure 2:
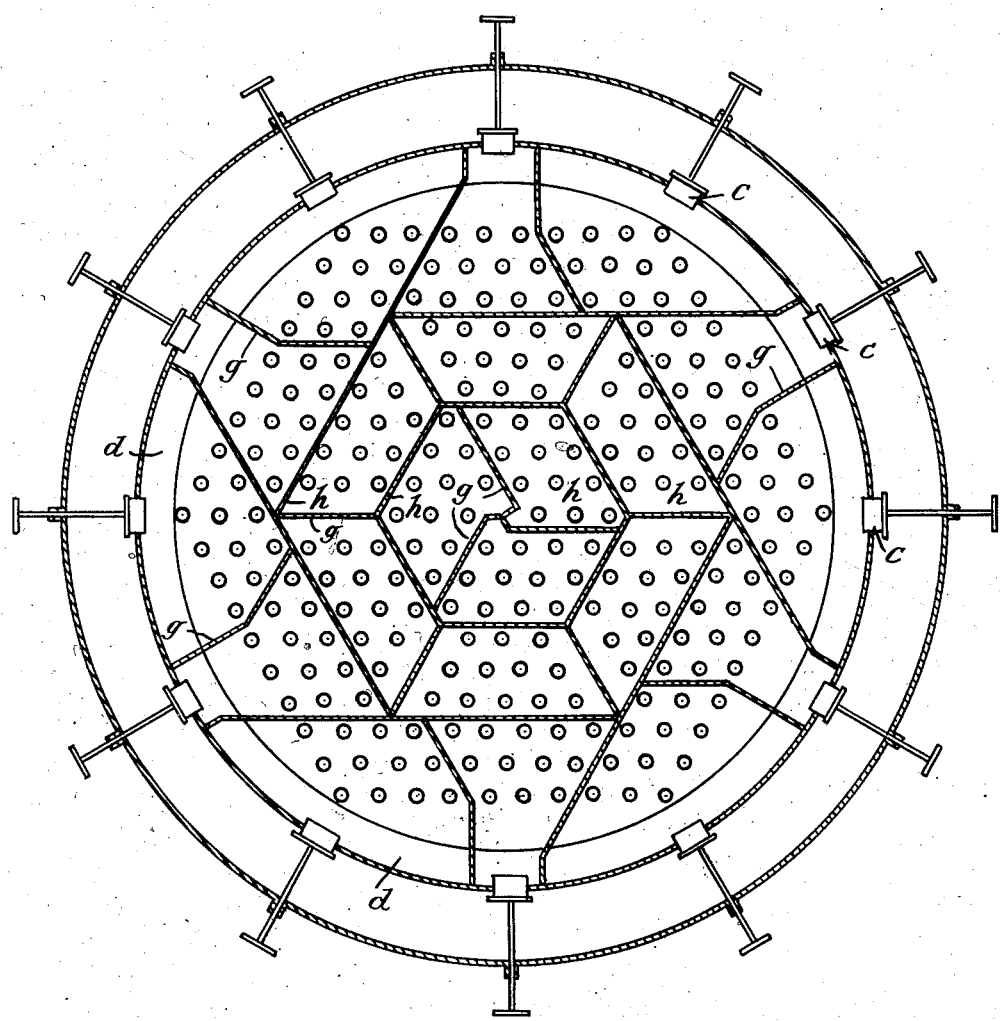

Referring to the drawings, Fig. 1 is a vertical section through a chamber comprising a great number of reaction tubes wherein the first catalytic mass A is arranged in the space around the tubes, the second catalytic mass B is arranged inside the tubes, while the third catalytic mass C is arranged in a space provided beneath the bundle of tubes. Figs. 2, 3 and 4 are cross-sections along the section lines 2—2, 3—3 and 4—4 respectively of Fig. 1.

The fresh gas is supplied through the spout $a$ to the annular channel $b$ surrounding the mantle of the chamber. By means of the valves $c$ which are distributed over the mantle (see Figs. 2, 3 and 4). Underneath the annular distribution plates $d$, $e$, $f$ (see Fig. 1), the gases are led from the annular channel into the chamber in regulated portions, where they are conveyed to the different cells.

The subdivision of the cross-section of the chamber into a series of cells of about equal size and being built up by radial partitions $g$ and tangential polygon-forming partitions $h$, is apparent from Fig. 2.

The supply of gas from the control valve to the corresponding cell is defined by lateral walls $i$ and $k$ between the different distribution plates. In the example represented by the drawings, the upper of the three distribution plates communicates with 12, the medium one communicates with 6 and the undermost plate communicates with 3 cells.

As illustrated in Fig. 1, the radial as well as the tangential partitions of the cells are carried upwards approximately to the catalytic mass B and the cross-section of the catalyst tubes is largely reduced over an equal length, in order thus to create as much free space as possible for the inflow of the gas. Above the reduced parts the cross-section of the tubes is so enlarged that the tubes nearly touch each other. Due to this fact the fresh gases led from off a cell under the enlarged bundle of tubes remain within the bundle apportioned to the said cell, until they meet the catalytic mass A. Moreover, the reduced cross-sectional area around the tubes which results from the said enlargement of the tubes, is attended by a marked increase of the velocity of the fresh gases along the catalytic mass B which again enables a good transition of heat from the tubes to the fresh gases on this way. On the other hand, the contraction of the tubes in the gas distribution space, where a good exchange of heat is not desired, will subdue such an exchange of heat.

In order to further subdue the exchange of heat in the gas distribution space, that part of the contracted tubes which is situated beneath the distribution plates where the fresh gases meet the tubes in a cross-current, may be heat-insulated by short protective tubes *l* or protective sheets *m* (see Figs. 1, 3 and 4). In some cases it is advisable to carry the cellular subdivision through over the full height of the reaction chamber.

What we claim is:

An apparatus for carrying out catalytic gas reactions comprising in combination a closed reaction vessel, a tube sheet disposed transversely of said reaction vessel and dividing the same into two chambers, a plurality of elongated open ended tubes disposed within one of said chambers and extending longitudinally of said vessel almost to the end of said vessel one end of said tubes being inserted in said tube sheet whereby said tubes communicate at such end with the other of said chambers, partition walls arranged among said tubes adjacent to said tube sheet, and extending from said tube sheet longitudinally of said reaction vessel, said partition walls defining the space around said tubes into a plurality of cells of substantially equal cross-section with a substantially equal number of tubes passing through each of said cells, a conduit for fluids, a connection from each of said cells to said conduit for the passage of fluid therebetween and a control valve in each of said connections for controlling the passage of fluid therethrough.

WILHELM PFANNMÜLLER.
JOSEF REICHART.